United States Patent
O'Flaherty et al.

(10) Patent No.: US 7,345,577 B2
(45) Date of Patent: Mar. 18, 2008

(54) DISPLAYS FOR REPORTING GUARD TOUR DATA

(75) Inventors: Michael B. O'Flaherty, Streetsboro, OH (US); Barry J. Markwitz, Solon, OH (US)

(73) Assignee: TimeKeeping Systems, Inc., Solon, OH (US)

(*) Notice: Subject to any disclaimer, the term of this patent is extended or adjusted under 35 U.S.C. 154(b) by 103 days.

(21) Appl. No.: 11/089,221

(22) Filed: Mar. 24, 2005

(65) Prior Publication Data

US 2006/0214776 A1    Sep. 28, 2006

(51) Int. Cl.
G08B 25/00    (2006.01)

(52) U.S. Cl. .................. 340/306; 340/506; 340/573.1; 702/187

(58) Field of Classification Search ................ 340/306, 340/506, 573.1, 996, 990; 702/187, 181, 702/182, 100, 122; 701/200, 208, 1
See application file for complete search history.

(56) References Cited

U.S. PATENT DOCUMENTS

| | | | | |
|---|---|---|---|---|
| 4,625,100 A | * | 11/1986 | Smith | 235/458 |
| 5,924,075 A | * | 7/1999 | Kanemitsu | 705/6 |
| 6,046,689 A | * | 4/2000 | Newman | 340/996 |
| 6,636,803 B1 | * | 10/2003 | Hartz et al. | 701/208 |
| 6,834,259 B1 | * | 12/2004 | Markwitz et al. | 702/187 |
| 6,874,126 B1 | * | 3/2005 | Lapidous | 715/711 |
| 2004/0046654 A1 | * | 3/2004 | Adams | 340/506 |

* cited by examiner

*Primary Examiner*—Anh V. La
(74) *Attorney, Agent, or Firm*—James A. Hudak

(57) ABSTRACT

Displays for exhibiting guard tour data are disclosed. The displays are arranged in a manner such that the data can be easily analyzed and readily acted upon. The displays use a combination of colors, graphics, and text, arranged in the cells of a table or spreadsheet, to present large volumes of guard tour data in a compact and easily analyzed manner. Each row of the table or spreadsheet represents one location within the guard tour. Each cell within that row represents one visit by a guard to the location. Cell background color or pattern, graphic symbol shape and color, and/or text color within each cell indicate whether the guard's visit to a specific location fell within predetermined parameters for that location. Additional graphics appear within the cell if the system has additional information regarding the visit to the tour location that cannot fit within the area of the cell.

9 Claims, 4 Drawing Sheets

Legend:
- Orange background in a cell indicates that the location was visited outside the desired time range.
- Spotted background in a cell indicates that there is related incident or observation information.
- Red triangle in the corner of a cell indicates that there is additional detailed information available.
- Solid square within a cell is a sample graphic symbol. Color of graphic symbol can indicate status of visit.

|   | A | B | C | D | E | F | G | H | I | J | K | L | M | N |
|---|---|---|---|---|---|---|---|---|---|---|---|---|---|---|
| 1 | 8/29/2003 (12:00 AM - 08:59 AM) |  | 12:00 AM | → |  |  |  |  |  |  |  |  |  |  |
| 2 |  | ◁ |  |  |  |  |  |  |  |  |  |  |  |  |
| 3 | Unit 3 |  | Max |  |  |  |  |  |  |  |  |  |  |  |
| 4 | C2 ROOM 2 |  | 15 | 0 | 14 | 16 | 16 | 16 | 16 | 15 | 16 | 16 | 15 | 15 |
| 5 | C2 ROOM 3 |  | 15 | 0 | 14 | 16 | 16 | 16 | 16 | 15 | 16 | 16 | 15 | 15 |
| 6 | C2 ROOM 4 |  | 15 | 0 | 14 | 16 | 16 | 16 | 16 | 15 | 16 | 16 | 15 | 15 |
| 7 | C2 ROOM 5 |  | 15 | 0 | 14 | 16 | 16 | 16 | 16 | 15 | 16 | 16 | 15 | 15 |
| 8 | C2 ROOM 6 |  | 15 | 0 | 14 | 16 | 16 | 16 | 16 | 15 | 16 | 16 | 15 | 15 |
| 9 | C2 ROOM 7 |  | 15 | 0 | 14 | 15 | 16 | 16 | 15 | 15 | 15 | 15 | 15 | 15 |
| 10 | C2 ROOM 8 |  | 15 | 0 | 14 | 15 | 16 | 16 | 15 | 16 | 15 | 15 | 15 | 15 |
| 11 | C2 ROOM 9 |  | 15 | 0 | 14 | 16 | 16 | 16 | 16 | 15 | 15 | 15 | 15 | 15 |
| 12 | C2 ROOM 10 |  | 15 | 0 | 14 | 16 | 16 | 16 | 16 | 15 | 15 | 15 | 15 | 15 |
| 13 | F2 ROOM 1 |  | 15 | 0 | 14 |  |  |  |  |  |  | 15 | 15 | 15 |
| 14 | F2 ROOM 2 |  | 15 | 0 | 14 | 15 |  |  |  |  |  | 15 | 15 | 15 |
| 15 | F2 ROOM 3 |  | 15 | 0 | 14 | 15 |  |  |  |  |  | 15 | 15 | 15 |

OFFICER: DARIN HALEY
TIME: 03:47 AM
EXCEPTION: Max Time Violation
EXPECTED: 15 minutes
ACTUAL: 17 minutes Legend:

| 15 | Green numeric text in a cell indicates that the location was visited within the time range specified. |
| 16 | Red numeric text and an orange background in a cell indicates that the location was visited outside the desired time range. |
| 15 | Spotted background in a cell indicates that there is related incident or observation information. |
|    | Red triangle in the corner of a cell indicates that there is additional detailed information available. |

Fig. 2

|   | A | B | C | D | E | F | G | H |
|---|---|---|---|---|---|---|---|---|
| 1 | 8/29/2003 (12:00 AM - 08:59 AM) |   | 12:00 AM |   |   |   |   |   |
| 2 |   | ◁ | Max |   |   |   |   |   |
| 3 | Unit 3 |   |   |   |   |   |   |   |
| 4 | C2 ROOM 2 |   | 15 | 12:02 AM | 12:16 AM | 12:32 AM | 12:47 AM | 12:56 |
| 5 | C2 ROOM 3 |   | 15 | 12:02 AM | 12:16 AM | 12:32 AM | 12:47 AM | 12:55 |
| 6 | C2 ROOM 4 |   | 15 | 12:02 AM | 12:16 AM | 12:32 AM | 12:48 AM | 12:56 |
| 7 | C2 ROOM 5 |   | 15 | 12:02 AM | 12:16 AM | 12:32 AM | 12:48 AM | 12:54 |
| 8 | C2 ROOM 6 |   | 15 | 12:02 AM | 12:17 AM | 12:32 AM | 12:48 AM | 12:54 |
| 9 | C2 ROOM 7 |   | 15 | 12:03 AM | 12:17 AM | 12:33 AM | 12:47 AM | 12:54 |
| 10 | C2 ROOM 8 |   | 15 | 12:02 AM | 12:17 AM | 12:33 AM | 12:47 AM | 12:53 |
| 11 | C2 ROOM 9 |   | 15 | 12:01 AM |   |   | 8 AM | 12:53 |
| 12 | C2 ROOM 10 |   | 15 | 12:01 AM |   |   | 8 AM | 12:53 |
| 13 | F2 ROOM 1 |   | 15 | 12:01 AM |   |   | 8 AM | 12:53 |
| 14 | F2 ROOM 2 |   | 15 | 12:01 AM |   |   |   | 12:51 |
| 15 | F2 ROOM 3 |   | 15 | 12:01 AM | 12:15 AM | 12:31 AM | 12:45 AM | 12:51 |

Tooltip (at row 13): OFFICER: ALBERT COLEMAN / TIME: 12:01 AM / INCIDENT: 01- NP PLAN, 13 - ASLEEP Legend:

| 12:16 AM | Green numeric text within a cell indicates that the location was visited at a time within the time range specified. |
| 12:32 AM (spotted) | Red numeric text and an orange background in a cell indicates that the location was visited at a time outside the time range specified. |
| 12:02 AM (spotted) | Spotted background in a cell indicates that there is related incident or observation information. |
| ◢ | Red triangle in the corner of a cell indicates that there is additional detailed information available. |

Fig. 3

| | A | B | C | D | E | F | G | H | I | J | K | L | M | N | O | P | Q |
|---|---|---|---|---|---|---|---|---|---|---|---|---|---|---|---|---|---|
| 1 | 8/29/2003 | | 12:00 AM | → | | | | | | | | | | | | | |
| 2 | | | | 00 | 01 | 02 | 03 | 04 | 05 | 06 | 07 | 08 | 09 | 10 | 11 | 12 | 13 |
| 3 | Unit 3 | ◁ | | | | | | | | | | | | | | | |
| 4 | A2 ROOM 2 | | 4 | 4 | 4 | 4 | 4 | 4 | 4 | 4 | 4 | 4 | 0 | 0 | 0 | 0 | 0 |
| 5 | A2 ROOM 3 | | 4 | 4 | 4 | 4 | 4 | 4 | 4 | 4 | 4 | 4 | 0 | 0 | 0 | 0 | 0 |
| 6 | A2 ROOM 4 | | 4 | 4 | 4 | 4 | 4 | 4 | 4 | 4 | 4 | 4 | 0 | 0 | 0 | 0 | 0 |
| 7 | A2 ROOM 5 | | 4 | 4 | 4 | 4 | 4 | 4 | 4 | 4 | 4 | 4 | 0 | 0 | 0 | 0 | 0 |
| 8 | A2 ROOM 6 | | 4 | 0 | 0 | 0 | 0 | 0 | 0 | 0 | 0 | 0 | 0 | 0 | 0 | 0 | 0 |
| 9 | A2 ROOM 7 | | 4 | 0 | 0 | 0 | 0 | 0 | 0 | 0 | 0 | 0 | 0 | 0 | 0 | 0 | 0 |
| 10 | A2 ROOM 8 | | 4 | 4 | 4 | 4 | 4 | 4 | 4 | 4 | 4 | 4 | 0 | 0 | 0 | 0 | 0 |
| 11 | A2 ROOM 9 | | 4 | 4 | 4 | 4 | 4 | 4 | 4 | 4 | 4 | 4 | 0 | 0 | 0 | 0 | 0 |
| 12 | A2 ROOM 10 | | 4 | 4 | 4 | 4 | 4 | 4 | 4 | 4 | 4 | 4 | 0 | 0 | 0 | 0 | 0 |
| 13 | F2 ROOM 1 | | 4 | 4 | 4 | 4 | 4 | 4 | 4 | 4 | 4 | 3 | 3 | 0 | 0 | 0 | 0 |
| 14 | F2 ROOM 2 | | 4 | 3 | 3 | 4 | 3 | 3 | 3 | 3 | 3 | 3 | 0 | 0 | 0 | 0 | 0 |
| 15 | F2 ROOM 3 | | 4 | 4 | 4 | 4 | 4 | 4 | 4 | 3 | 3 | 3 | 0 | 0 | 0 | 0 | 0 |

EXPECTED VISITS: 4
ACTUAL VISITS: 3

Legend:

| 4 | Green numeric text in a cell indicates the actual number of visits to a location within a one-hour period. |
| ▒ | Red numeric text and an orange background in a cell indicates the number of vistis to a location within a one-hour period. |
| ◣ | A red triangle in the corner of a cell represents that there is additional detailed information available. |

Fig. 4

DISPLAYS FOR REPORTING GUARD TOUR DATA

TECHNICAL FIELD

The present invention relates, in general, to data collected during a guard tour and, more particularly, to displays for exhibiting such guard tour data so that the data can be easily analyzed.

BACKGROUND ART

Computerized guard tour systems typically store time stamped data relating to guard identification, locations visited, and incidents observed by a guard during a tour. In some settings, particularly in prisons and other high security institutions, guard tour data are collected at a high rate causing the rapid creation of a large volume of data. It is often imperative that this large volume of data be presented to and interpreted by users quickly in order to correct serious problems that may affect human safety and property. Furthermore, it is often desirable to present tour data in a manner that readily shows patterns of deficient guard performance as it relates to particular tour locations. Presently available guard tour systems are deficient in this regard. While most guard tour systems can gather and analyze tour data properly, the present systems compile data in the form of long text-based reports that are difficult to read and analyze in a rapid and error-free manner. Such reports do not readily show patterns of deficient guard performance as it relates to particular tour locations.

In the case of correctional institutions, guards are typically required to make rounds to check the status of locations and/or inmates within the facility at a predetermined frequency, such as every fifteen minutes. Because human safety is involved, it is imperative that the guard tour system user quickly and accurately verifies that rounds are being done properly and reports any discrepancies to supervising personnel. When tour data is presented in typical text-based reports, such verification is difficult to accomplish and prone to errors. It is also desirable to show patterns of deficient guard performance as it relates to particular locations or inmates within the facility. The typical text-based reports produced by presently available guard tour systems do not readily show such patterns.

In view of the foregoing deficiencies associated with text-based guard tour reports produced by presently available guard tour systems, it has become desirable to develop displays for exhibiting guard tour data so that the data can be easily analyzed and quickly acted upon.

SUMMARY OF THE INVENTION

The present invention solves the problems associated with text-based reports produced by presently available guard tour systems and other problems by providing a displays for exhibiting guard tour data so that the data can be easily analyzed and quickly acted upon. The displays use a combination of colors, graphics, and text, arranged in the cells of a table or spreadsheet, to present a large volume of guard tour data to a user in a compact and easily analyzed manner facilitating the identification and quick isolation of problem locations. Each row of the table or spreadsheet represents one location within a guard tour. Each cell within that row represents one visit by a guard to the location. Cell background color or pattern, graphic symbol shape and color, and/or text color within each cell indicate whether the guard's visit to a specific tour location fell within predetermined parameters for that location. Additional graphics appear within the cell if the system has further information about the visit to the tour location that cannot fit within the area of the cell. In printed versions, the additional information appears in printed form and contains a means for relating to the appropriate cell.

BRIEF DESCRIPTION OF THE DRAWINGS

FIGS. 1 through 4 exhibit guard tour data in four different displays to meet different user requirements. The data shown in these FIGS. are typical of that collected in high security institutions where locations must be visited by guards at a minimum frequency, such as every fifteen minutes.

FIG. 1 is a display of guard tour data illustrating a "quick-view" or general status display of such data. The contents of each cell indicate the status of the visit relative to predetermined parameters. As illustrated in this Figure, a user has positioned the cursor over a cell (Row 5, Column G) to display additional information relating to the visit it represents.

FIG. 2 is a display of the guard tour data illustrating the "time-between" guard visits to a location. The contents of each cell indicate the time that has elapsed since the previous visit to the same location. As illustrated in this Figure, a user has positioned the cursor over a cell (Row 9, Column H) to display additional information relating to the visit it represents.

FIG. 3 is a display of the guard tour data illustrating a "time" display of visits to locations. The contents of each cell indicate the time of day at which each visit occurred. As illustrated in this Figure, a user has positioned the cursor over a cell (Row 12, Column D) to display additional information relating to the visit it represents.

FIG. 4 is a display of the guard tour data illustrating a "rounds" display of such data. Each column represents one of the 24 hours in a day. Each row represents a guard tour location. The contents of each cell display the number of guard visits to the location within an hour. As illustrated in this Figure, a user has positioned the cursor over a cell (Row 14, Column J) to display additional information relating to the data in that cell.

DESCRIPTION OF THE PREFERRED EMBODIMENT

Figure 1:
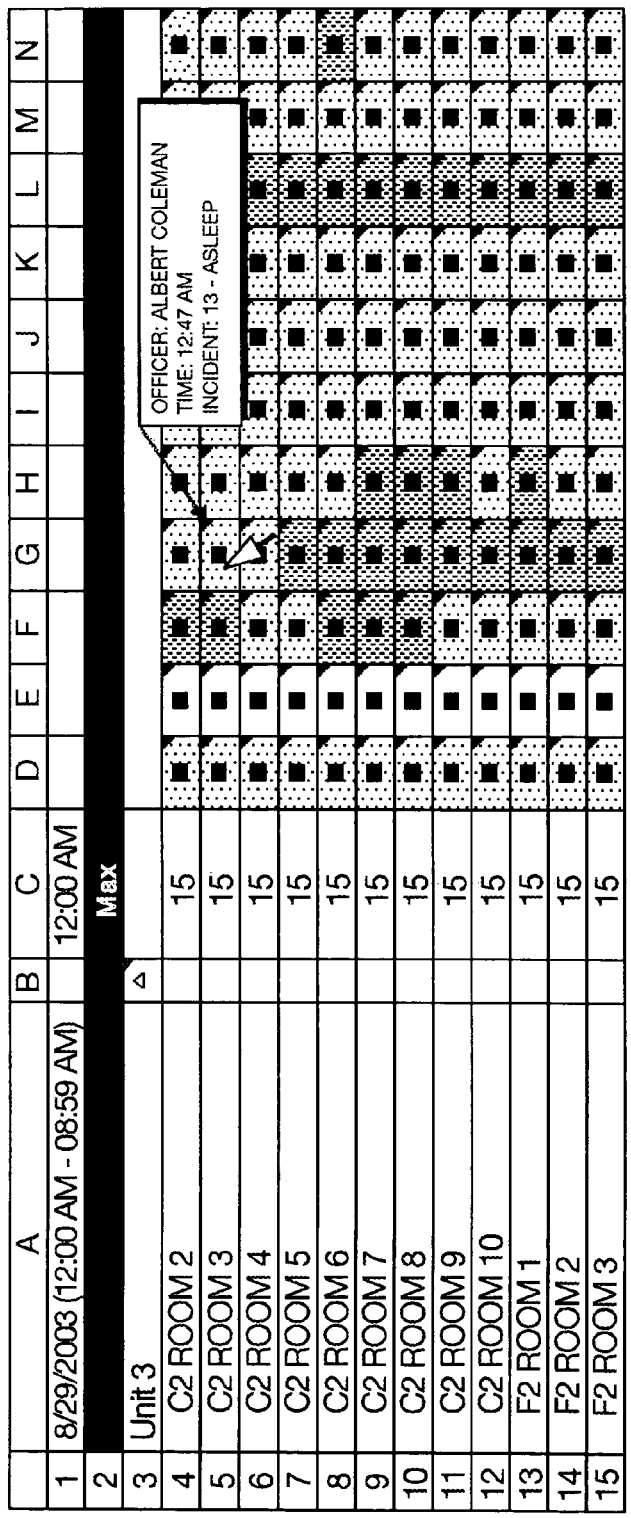

Referring now to the Figures where the illustrations are for the purpose of describing the preferred embodiment of the present invention and are not intended to limit the invention described herein, FIG. 1 is a display of guard tour data illustrating a "quick-view" or general status display of such data. The display is arranged in a table or spreadsheet format. Each row of the table or spreadsheet represents one location within the facility. Columns of the table or spreadsheet define sequential visits made by guards, with the leftmost column representing the first visit. Each cell within the table or spreadsheet, as defined by the intersection of a specific row and column, represents one visit by a guard to that specific location. The display uses a combination of colors and graphics arranged in the cells of the table or spreadsheet to present a large volume of status data relating to guard tours within the facility in a compact and easily analyzed form facilitating the identification and quick isolation of problem locations. In this instance, cell background pattern and graphic symbol color within each cell indicate whether the guard's visit fell within predetermined parameters for that location, as described by the legend at the bottom of the display. The system can indicate that it has additional information about the visit that cannot fit within the area of the cell. If additional information about a guard visit is available, a triangular graphic will appear in the upper right hand corner of the cell. As shown, a user has moved the computer's cursor over a cell (Row 5, Column G) representing the fourth visit to the location "Unit 3, C2, Room 3". Moving the cursor over this cell displays additional data relating to the visit. In this case, the additional data includes the officer's name, time of the officer's visit to that location, and the fact that an "incident" has occurred at that location.

Referring now to FIG. 2, a display of guard tour data is shown that quickly provides detailed information as to the "time-between" guard visits to a location. As in FIG. 1, the display is arranged in a table or spreadsheet format. Each row of the table or spreadsheet represents one location within the facility. Columns of the table or spreadsheet define sequential visits made by guards, with the leftmost column representing the first visit. Each cell within the table or spreadsheet, as defined by the intersection of a specific row and column, represents one visit by a guard to that specific location. As in FIG. 1, the display uses a combination of colors, graphics, and text arranged in the cells of the table or spreadsheet to present a large volume of guard tour data to a user in a compact and easily analyzed form facilitating the identification and quick isolation of problem locations. In this Figure, the textual contents of each cell indicate the time that has elapsed since the previous visit by a guard to the same location. The color of elapsed time numerals together with cell background pattern indicate whether the elapsed time fell within predetermined parameters for the location, as described by the legend at the bottom of the display. As in FIG. 1, the system can indicate that it has additional information about the visit that cannot fit within the area of the cell. If additional information about a guard visit is available, a triangular graphic will appear in the upper right hand corner of the cell representing the visit. As shown, a user has moved the computer's cursor over a cell (Row 9, Column H) representing the fifth visit to the location "Unit 3, C2, Room 7". Moving the cursor over the cell displays additional data relating to the visit. In this case, the additional data includes the officer's name, time of the officer's visit to that location, and the fact that a "maximum time" violation "exception" occurred, and that the expected time of fifteen minutes was exceeded by the officer creating the violation.

Referring now to FIG. 3, a "time" display of visits to locations is shown. This display quickly provides detail as to the time of day at which each guard visit occurred. As in FIGS. 1 and 2, the display is arranged in a table or spreadsheet format. Each row of the table or spreadsheet represents one location within the facility. Columns of the table or spreadsheet define sequential visits made by guards, with the leftmost column representing the first visit. Each cell within the table or spreadsheet, as defined by the intersection of a specific row and column, represents one visit by a guard to that specific location. As in FIGS. 1 and 2, the display uses a combination of colors, graphics, and text arranged in the cells of the table or spreadsheet to present a large volume of guard tour data to a user in a compact and easily analyzed form facilitating the identification and quick isolation of problem locations. In this Figure, the textual contents of each cell indicate the time of day at which the guard's visit to the location occurred. The color of time numerals together with cell background pattern indicate whether the elapsed time fell within predetermined parameters for the location, as described by the legend at the bottom of the display. As in FIGS. 1 and 2, the system can indicate that it has additional information about the visit that cannot fit within the area of the cell. If additional information about a guard visit is available, a triangular graphic will appear in the upper right hand corner representing the cell. As shown, a user has moved the computer's cursor over a cell (Row 12, Column D) representing the first visit to the location "Unit 3, C2, Room 10". Moving the cursor over the cell displays additional data relating to the visit. In this case, the additional data includes the officer's name and the time of the officer's visit to the location.

Referring now to FIG. 4, a display of guard tour data is shown that provides detail as to the number of visits that has occurred to each location during a given hour of the day. The display is arranged in a table or spreadsheet format. Each row of the table or spreadsheet represents one location within the facility. Each column of the table or spreadsheet represents a one-hour period. Each cell with the table or spreadsheet, as defined by the intersection of a specific row and column, displays a numeral indicating the number of guard visits to the location within the one-hour period. Here again, the display uses a combination of colors, graphics, and text arranged in the cells of said table or spreadsheet to present a large volume of guard tour data to a user in a compact and easily analyzed form facilitating the identification and quick isolation of problem locations. In this instance, the textual contents of each cell indicate number of guard visits to the location during the indicated one-hour period. The color of numerals representing guard visits together with cell background pattern indicate whether the number of guard visits fell within predetermined parameters for the location, as described by the legend at the bottom of the display. As in the previous Figures, the system can indicate that it has additional information about the visit that cannot fit within the area of the cell. If additional information about a guard visit is available, a triangular graphic will appear in the upper right hand corner of the cell representing the visit. As shown, a user has moved the computer's cursor over a cell (Row 14, Column J) that displays the number of guard visits to the location "Unit 3, F2, Room 2" between 6:00 AM and 6:59 AM on Aug. 29, 2003. Moving the cursor over the cell displays additional data relating to the visit. In this case, the additional data shows that the number of visits expected during that hour was four and the number that actually occurred was three.

From the foregoing, it is apparent that the present invention uses easily recognized and compact graphical means to represent the status of the guard's visit to specific locations during a tour, and thus, allows a large volume of data to be quickly analyzed by a user, permitting the user to readily and quickly recognize problem situations. Displaying relatively complex text data readily on demand permits the user to quickly view detailed information regarding any guard visit that they may choose to investigate. From such a presentation of guard tour data, any patterns of deficient guard performance relating to a particular location within a facility become readily apparent, and when such problems are recognized, it is relatively simple to obtain information with respect to same.

It should be noted that the shape of the graphical symbols may be varied to indicate the type of event that occurred at a specific location on a guard tour, in addition to the status of the visit to the location. For example, a small open door icon can be used to indicate that a door was found unlocked. Also, the color of the icons can indicate the criticalness of the event permitting the user to quickly direct his attention to the most critical situations.

In addition, graphical status information for each tour location may be superimposed on a map of the facility. A red or "alarm" symbol may be displayed for any location where guard visits has occurred and which do not fall within parameters established for the location and which a supervisory user has not acknowledged. "Clicking" on an "alarm" symbol will cause detailed information to be displayed and entering a password will acknowledge that a supervisory user has viewed the information. When this has occurred, the "alarm" symbol will be extinguished and is replaced by a "normal" symbol.

Certain modifications and improvements will occur to those skilled in the art upon reading the foregoing. It is understood that all such modifications and improvements have been deleted herein for the sake of conciseness and readability, but are properly within the scope of the following claims.

We claim:

1. A display of guard tour data comprising a listing of guard tour locations oriented along a first axis, a listing of guard tour visits to said guard tour locations oriented along a second axis, and a plurality of cells each defined by the intersection of a guard tour location in said listing of guard tour locations and a guard tour visit in said listing of said guard tour visits, each of said cells representing a guard tour visit to a specific guard tour location and exhibiting at least one parameter derived from guard tour data relating to a visit by a guard to said specific guard tour location.

2. The display as defined in claim 1 wherein said at least one parameter derived from said guard tour data is the time of occurrence of said visits to said guard tour locations.

3. The display as defined in claim 1 wherein said at least one parameter derived from said guard tour data is the amount of time that has elapsed between visits to said guard tour locations.

4. The display as defined in claim 1 wherein said at least one parameter derived from said guard tour data is the number of visits that have occurred to guard tour locations during a predetermined period of time.

5. The display as defined in claim 1 wherein said listing of guard tour locations is oriented along a vertical axis causing the creation of rows of data relating to said guard tour visits to said guard tour locations.

6. The display as defined in claim 1 wherein said listing of guard tour visits to guard tour locations is oriented along a horizontal axis causing the creation of columns of data relating to said guard tour visits to said guard tour locations.

7. The display as defined in claim 1 wherein a combination of colors and graphics is provided within each of said cells to represent said at least one parameter derived from said guard tour data.

8. The display as defined in claim 1 further including means to indicate the existence of additional data relating to the guard tour visit to a specific guard tour location.

9. The display as defined in claim 8 further including the use of a cursor means, placement of said cursor means over said additional data existence indicating means causing the display of said additional data within a cell relating to a guard tour visit to a guard tour location defined by said cell.

* * * * *